2,625,330

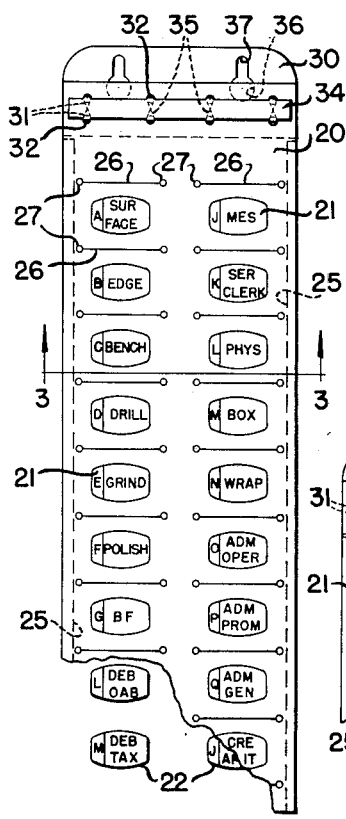
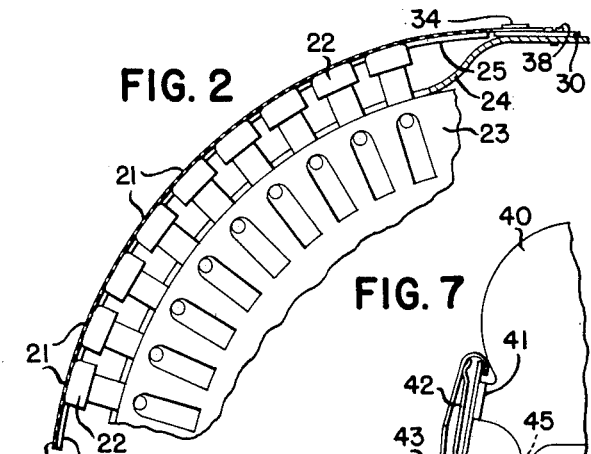
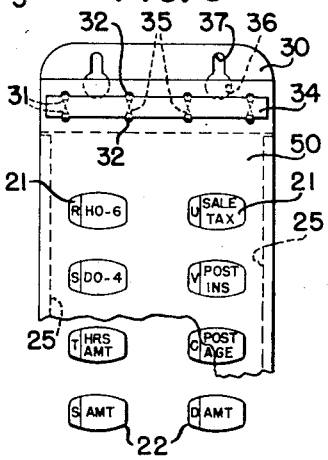
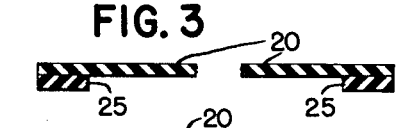
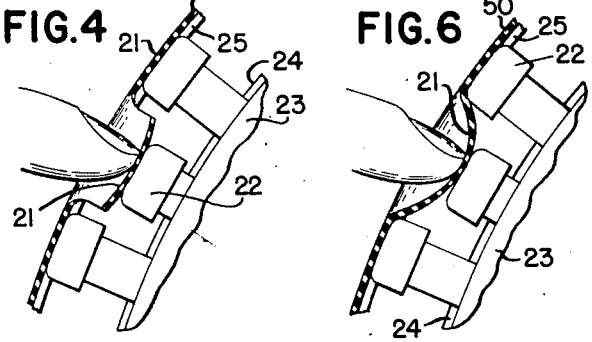
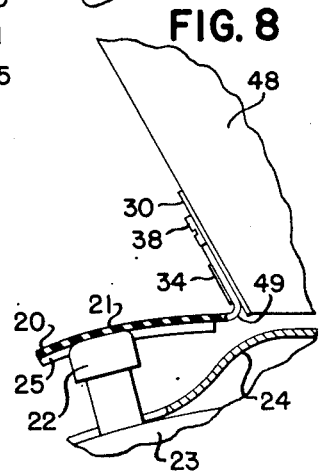
Jan. 13, 1953    K. M. BUCKEY ET AL    2,625,330
CLASSIFICATION DESIGNATION CHANGE
MEANS FOR ACCOUNTING MACHINES
Filed Feb. 16, 1950
INVENTORS
KENNETH M. BUCKEY
PAUL M. KOONS &
PASCAL SPURLINO
BY
THEIR ATTORNEYS Patented Jan. 13, 1953

UNITED STATES PATENT OFFICE 2,625,330

CLASSIFICATION DESIGNATION CHANGE MEANS FOR ACCOUNTING MACHINES

Kenneth M. Buckey, Paul M. Koons, and Pascal Spurlino, Dayton, Ohio, assignors to The National Cash Register Company, Dayton, Ohio, a corporation of Maryland Application February 16, 1950, Serial No. 144,546

4 Claims. (Cl. 235—146)

This invention relates to accounting machines and the like, and more particularly to means which might aptly be termed a classification designation change means for use in connection with a bank or banks of control keys of the accounting machine, to change the classifications of the control keys to render the accounting machine capable of registering and recording other classifications than those for which it was originally constructed, without in any way changing any of the mechanism of the machine.

Such classification designation change means has marked thereon definite areas which correspond identically with the locations of the bank or banks of control keys with which said change means is adapted to be used, and in these areas there is provided indicia, the purpose of which is to indicate to the operator certain specific items, departments, or control information for analysis purposes, for example, used for the control of making records in connection with such items, departments, or analysis control.

Such classification change means is in the form of a flexible opaque material, having thereon in the above mentioned areas, indicia different from that on the regular keys. This flexible indicia carrying means is placed over the top of a key bank or key banks and when so placed on the machine the indicia thereon is directly above the keys.

Such indicia carrying means, as above mentioned, is a key caption or classification designation change means whereby a single machine can be readily adapted for uses other than the specific uses for which it was originally intended. Thus, a machine which is used for a specific purpose might be idle at certain times and by the use of said designation change means, or indicia carrying means, such idle machine can be used for an entirely different purpose. For example, in connection with a machine constructed to record data relative to getting out a payroll and printing payroll checks, such as is illustrated and described in the United States patent issued to Pascal Spurlino, Rudolph Moser, Alfred G. Kibler, Marvin D. Frost, and Walter K. Kreider, No. 2,467,704, dated April 19, 1949, after the payroll has been posted and the proper payroll checks printed by the machine and all other records relative to such payroll have been printed, the totalizers are then all cleared and the records of such totals are printed on the proper posting media in the machine.

This same machine may now be used for an entirely different purpose by simply attaching a classification designation change means to, for example, two rows of the regular classification keys. By so doing the machine may now be used for posting data having classifications wholly different than the classifications previously used for payroll posting and recording.

As a specific example, assume that a payroll machine is being used in an industrial plant where spectacle lenses are manufactured and the company requires an analysis of costs of manufacture for the several steps in the production, packaging and shipping of the lenses.

In such a case a classification designation change cover is attached to two of the regular payroll classification key banks, and said cover has classification indicia thereon in the key positions thereof, as above mentioned. Each key position is marked alphabetically A to R, and adjacent those letters the following classifications may be marked: "Surface," "Edge," "Bench," "Drill," "Grind," "Polish," "Bifocal," "Mess." for Messenger, "Ser. Clerk" for Service Clerk, "Phys." for Physician, "Boxing," "Wrapping," "Adm. Prom." for Administration Promotion, "Adm. Oper." for Administration Operation, "Adm. Gen." for Administration General, and "Credit." Having such a classification key cover, the same machine which was formerly used for payroll posting and payroll check printing can now be used for analyzing the costs of various operations in connection with the production of the lenses.

In other words, the totalizers which are used for recording the data relative to the posting of the payroll are now used for the recording of the costs of various production operations, since the original payroll machine classification keys are now operated by the operator depressing the same keys to represent the new classifications assigned to them by the use of the classification change cover, each classification sign or indication being, as above stated, directly above a control key.

Another classification change cover having thereon indicia representing different manufacturing departments, such as "HO-6," "DO-4,"

etc., and also other costs, such as "Sales Tax," "Postage," etc., may be attached to the same payroll keys whereby the same totalizers associated with said keys may be used to compile still further data relative to the business.

All of the above mentioned additional classificational data may be compiled without any mechanical changes in the machine. Thus by the use of the present invention the capacity and the use of the machine is increased manyfold.

Therefore, from the above description it can be readily seen that by the use of a single set of keys and the classification change covers for said keys, the distribution of data is greatly increased, since several of the classification covers may be used to handle the distribution of as many different items or department records as is necessary to completely analyze a business, thus permitting a thorough study of the problem from the standpoint of turnover of merchandise which in turn will properly regulate buying so as to keep the inventories at the proper levels.

These classification change covers may be filed in the ledgers to give a specific account of various items or department controls.

Moreover the classification covers are constricted so as to be readily removed and others as readily attached to the machine above the control keys.

As another example where the present invention may be used to great advantage is in banks, in their proof departments, in connection with their bank proof machines, of the type shown and described in the Pascal Spurlino and Conrad Rauch Patent No. 2,361,662, granted October 31, 1944.

When used in connection with this type of machine for bank proof work the capacity and use of the machine may be greatly increased.

For example, in the machine illustrated in the patent, the control rows Nos. 2 and 3 of the machine have captions on the keys for controlling the distribution and recording of checks according to local banks Nos. 1, 2, 3 and 4, and also according to tellers Nos. 1, 2, 3 and 4 for the cash items.

By the attachment of one of the classification change covers having indicia thereon, the number of local banks may be increased for recording data therefrom and also the number of tellers may be increased for recording various teller items such as cash and checks.

Also, in place of the ledger keys and transit banks, the classification change cover may carry other indicia, for example, transit bank numbers 4 to 6, and in place of the ledgers, the indicia may read, for example, charge items, credit items, etc., on which the bank may wish to keep individual records.

Therefore, it is an object of the present invention to provide a novel classification change means, which is readily attachable and readily detachable from accounting machines, whereby the classifications of the accounting machine for recording and registering purposes may be changed without in any way changing the mechanism of the machine, thus greatly increasing the capacity and use of the machine.

Another object of the present invention is to provide a classification change means made from flexible material, which when attached to the machine will conform to the contour of a row of control keys whereby the keys may be depressed to represent classifications other than those originally on the key checks.

Another object of the present invention is to provide a classification change cover for use in connection with control banks of keys on accounting machines, said cover having thereon definite areas corresponding to the locations of the keys, said areas carrying classification indicia different from that on the control keys whereby the mechanism of the machine may be used for registering and recording data according to classifications on the classification change cover without having to change any of the mechanism of the machine.

Another object of the present invention is to provide a novel classification change means adapted for use in connection with control key banks of accounting machines, said classification means being readily attachable to the machine and being opaque and having classification indicia therein located to conform with the locations of the keys which said cover conceals, said indicia areas being the means of locating the keys beneath the classification change cover, whereby classificational data other than that designated by the original keys may be recorded in the machine without having to change the mechanism of the machine to make such recordings.

Another object of the present invention is to provide an opaque classification change cover adapted to be used to cover up the control keys of an accounting machine, said cover having thereon, in positions corresponding to the locations of the positions of the control keys which are covered by said cover, classification indicia, said cover being partially severed between each of the indicia-bearing areas.

Another object of the present invention is to provide a flexible opaque classification change cover which is readily attachable and readily removable from an accounting machine keyboard, said cover having specific indicia-bearing areas corresponding to the locations of the control keys of the machine upon which the cover is used, and also having along the edges of the cover a binding made of flexible material to aid in causing the material to conform to the contour of the key bank and thereby lay in contact with the tops of the control keys of the keyboard of the machine.

With these and other incidental objects in view, the invention includes certain novel features of construction and combinations of parts, the essential elements of which are set forth in appended claims, and preferred and modified forms of embodiment of which are hereinafter described with reference to the drawings which accompany and form a part of this specification.

In said drawings:

Fig. 1 is a top plan or face view of the classification change cover, the same being partly broken away near the bottom thereof to show a portion of two banks of control keys which are covered by the classification change cover.

Fig. 2 is a side elevation of a bank of control keys of the type of machine with which the present invention is adapted to be used, and showing the classification change cover, in section, attached to the machine and lying on the bank of control keys, and conforming to the contour of the curvature of the bank.

Fig. 3 is an enlarged section view on line 3—3 of Fig. 1.

Fig. 4 is an enlarged side view of a portion of the key bank showing one of the keys depressed by the operator having depressed the corresponding indicia area position of the classification change cover, the cover being shown in section.

Fig. 5 shows a modified form of a classification change cover partly broken away to show a portion of two banks of control keys which are covered by said cover.

Fig. 6 is an enlarged side elevation of a portion of the key bank showing one of the keys depressed by means of the operator depressing the indicia bearing area of the key cover, shown in section, directly above the key which is shown depressed.

Fig. 7 is a fragmentary enlarged side elevation of a portion of an accounting machine showing a different form of means for attaching the classification change cover to this type of machine.

Fig. 8 is a fragmentary enlarged side elevation of a different form of means for attaching the classification change cover to an accounting machine.

*General description*

Described in general terms, the present invention comprises a classification designation change means, adapted to be used in connection with business machines and various types of accounting machines, and placed on the control keys thereof, whereby the registration and recording of classificational data other than that originally called for by the keys on the machine, may be registered and recorded in the machine without in any way changing any of the mechanism of the machine.

This classification change means is preferably in the form of a flexible opaque material having thereon indicia-bearing areas which are located substantially identical with the locations of the keys of the machine on which this classification change cover is to be used, so that the operator by depressing any selected indicia-bearing area will automatically depress the accounting machine control key which lies directly beneath this particular area.

These classification change covers are provided with a rigid means secured to the top edge thereof, by means of which they may be removably attached to the accounting machine.

These covers are also provided with flexible members adjacent the two side edges on the bottom thereof, which material is bonded to the cover. These flexible members keep the covers in their proper positions sidewise on the key bank or key banks, whichever the case may be, of the accounting machine to which the classification change cover is attached.

After the operator has depressed one of the control keys through the depression of the corresponding indicia bearing area of the classification change cover, upon release of the operator's finger from the key, the classification change cover flexes back to its normal position.

In the preferred form of the invention the classification change cover is slit between each of the indicia-bearing areas and above the top area and below the bottom area.

*Detailed description*

The classification change means in the preferred form is shown in top plan or face view in Fig. 1 and comprises a flexible opaque key cover 20 having indicia-bearing areas 21 located in positions so as to be directly above accounting machine control keys 22 (Figs. 1 and 2) of the type of machine in the above mentioned Spurlino et al. Patent No. 2,467,704.

The cover 20 in Fig. 1 is of sufficient width to cover two banks of keys 22, which are mounted in the usual type of key frames 23. A portion of the machine cabinet which covers the key frame 23 is shown at 24.

These covers 20 may be wide enough to cover three or four banks of control keys as the occasion demands or said covers may be made to cover a single bank of keys only.

The indicia-bearing areas 21 have, as an example, classificational indicia relating to a payroll machine being used in a spectacle lens manufacturing industry. A portion of the control keys 22, of two of the banks of the payroll machine are shown in Fig. 1, bearing indicia pertinent to the production and recording of a payroll. Securely bonded to the underside of the cover 20 adjacent each of the side edges thereof, is a flexible guide strip 25, the purpose of which is to add weight to the cover 20 to cause it to remain in contact with the tops of the keys 22 and to prevent the cover 20 from being moved sidewise off the tops of said keys 22.

The cover 20 has slits 26 between each of the indicia-bearing areas 21 and above the top area and below the bottom area, and to prevent the cover from being torn at the ends of the slits each end of each slit 26 terminates in a hole 27.

In order that the cover 20 may be readily attached and detached from the accounting machine it is secured to a rigid attaching plate 30 preferably made of metal. This plate 30 is provided with eight small holes 31. The cover 20 has eight small holes 32 and said cover 20 is secured to the plate 30 by means of a clip bar 34 having eight sharp prongs 35, which are projected through the holes 32 of the flexible cover 20 and through the holes 31, and then bent over on the back of the metal plate 30, as shown in Fig. 1.

The metal plate 30 has two attaching holes, each of which is comprised of a large area 36 and a small area 37.

To attach the cover 20 to the keyboard of the machine, the machine shown in Fig. 2 is provided with two screws 38, secured to the cabinet 24. The heads of these screws are of such a diameter as to allow a plate 30 to be inserted over those screws in the large portions 36, after which the cover is drawn to the left, as viewed in Fig. 2, whereby the plate 30 is moved to such a position that the shanks of the screws 38 are located in the small sections 37 of the slots in the plate 30, thus retaining the cover 20 on the machine. The cover 20 is then draped down over the keys 22, as shown in Fig. 2, so as to contact the tops of all of the keys in the bank or banks.

Fig. 4 shows one of the control keys 22 in its depressed position and illustrates how the cover 20 flexes when the operator depresses one of the indicia-bearing areas 21 to in turn depress the control key 22 directly beneath said depressed area 21. Thus, the operator may, by depressing different or selected ones of the indicia-bearing areas 21, according to the classification desired, depress the key 22 directly beneath the area 21 which has been depressed, thereby causing the machine to register and record data according to the classificational indicia on the change cover 20 instead of that which is upon the control keys 22 beneath said cover.

In Fig. 7 is shown a modified form of an attachment plate when the classification change cover is used on a payroll machine, wherein a platen for supporting a basic payroll sheet is used and the platen extends above the control keys. The above mentioned Spurlino et al. Patent No. 2,467,704 shows a basic payroll sheet platen, but in this patent this platen does not extend above the control keys, and therefore, a classification change cover 20, having an attaching plate 30, is used, where the platen does not extend above the control keys.

In Fig. 7 is shown one platen support bracket 40 having a bent-over ear 41 to which is secured a spring clip 42. The classification change cover 20 is secured to an attaching plate 43 by means of a clip bar 44, like the previously described clip bar 34. This bar 44 has prongs 45 projecting through the plate 43 and the cover 20, and bent over to secure the cover 20 to the plate 43.

To assemble this classification change cover 20 it is draped over the keys 22 and bent as at 46. The spring clip 42 is pressed toward the platen bracket ear 41, and the attaching plate 43 slipped over the clip, whereby the latter, by means of its spring tension, retains the plate 43 and consequently the cover 20 in the position shown.

Fig. 8 shows the classification change cover 20 like that shown in Fig. 1 and it is shown attached to a machine wherein the attaching locating screws 38 are mounted on a check-sorting box of the type shown in the Spurlino and Rauch Patent No. 2,416,598. Such check-sorting boxes are used in connection with machines of the type shown in the Spurlino and Rauch Patent No. 2,361,662, in proof departments of banks.

In this Fig. 8 is shown a portion of one of the front sorting compartments 48 having the attachment screws 38 in the front thereof. When the classification change cover 20 is attached to this type of machine the attachment plate 30 is slipped over the heads of the screws 38 and the cover 20 is bent as at 49 and then draped down over the control keys 22.

Modified form of cover

Fig. 5 shows a modified form of a classification change cover. This cover designated 50 is identical with the cover 20 shown in Fig. 1 except that it has no slits 26 adjacent each of the indicia-bearing areas 21, nor does it have the holes 27. This cover 50 has the guide strips 25, which are bonded to the cover 50 adjacent the side edges thereof, and the cover is mounted on an attaching plate 30 and secured thereto by means of a clip bar 34 having the prongs 35 projected through the holes 31 of the plate 30 and the holes 32 of the cover 50 in identically the same manner as the clip bar 34 secures the cover 20 to the attaching bar 30.

In Fig. 6 which is an enlarged fragmentary sectional view, it shows an operator having depressed the cover 50 at one of the indicia-bearing areas 21, to in turn depress the key 22 which lies directly beneath that particular area. This Figure 6 shows how the cover 50 is flexed without the slits 26 when the operator depresses said cover 50 at one of the indicia-bearing areas 21.

From the above description it can be clearly seen that when it is desired to change the registering and recording of data from than that called for by the normal control keys 22, the operator merely attaches one of the classification change covers 20 by the medium of the screws 38 and the attaching plate 30, and then drapes the cover 20 down over the control keys 22, as shown in Fig. 2, whereupon the operator may then register and record data according to the classificational indicia which is marked in the indicia-bearing areas 21 of the cover 20, which control data is entirely different than that on the keys 22. It can also be clearly understood that this registering and recording of the data according to the classifications on the classification change control cover 20 are effected by the machine without in any way changing any of the mechanism of the machine.

While the form of device herein shown and described is admirably adapted to fulfill the objects primarily stated, it is to be understood that it is not intended to confine the invention to the paricular forms of embodiment herein disclosed.

What is claimed is:

1. A classification change means for use with banks of accounting machine classified data recording control keys and adapted to be removably attached to the machine, said change means comprising a single flat flexible opaque member to contact the tops of said keys and conceal said banks of keys when said member is attached to the machine, said member having indicia-bearing areas on the upper surface thereof and conforming to the locations of the concealed keys in all banks whereby the classified data recording control keys are operated by depressing the desired indicia-bearing areas to change the recording of classified data according to the indicia on said opaque member thereby increasing the control capacity of said control keys.

2. A classification change means for use with a plurality of banks of classification data control keys of an accounting machine, comprising a removably attachable flat flexible opaque member to contact the tops of all of said keys in all of said banks of keys to conceal said banks of control keys when said member is attached to the machine, said member having indicia-bearing areas on the upper surface thereof and conforming to the locations of the concealed keys of said plurality of banks of keys, said opaque member also having slits adjacent the tops and bottoms of said indicia-bearing areas to facilitate in the operation of the concealed control keys of said plurality of banks upon the depression of the indicia-bearing areas to change the recording of the classification data control keys, thereby increasing the control capacity of said control keys.

3. A classification change means attachable to an accounting machine for use with banks of classification data control keys of said accounting machine to increase the control capacity of said control keys, said change means comprising a flexible opaque member having indicia-bearing areas thereon, said areas conforming to the locations of the keys in the banks which are concealed when the member is attached to the machine, said member having slits adjacent the tops and bottoms of said indicia-bearing areas and longer than the width of the areas to facilitate in the operation of the concealed control keys upon depression of the indicia-bearing areas to change the recording of the classification data of the data control keys.

4. A registering and recording machine having a plurality of banks of depressible control keys, said keys having data information thereon to control the registering and recording of information corresponding to said data; a removable, attachable, flat and flexible opaque member having data information on specific areas thereof, said areas corresponding to the locations of the keys in said banks of keys when said member is attached to the machine to contact the tops of all of said keys to conceal the keys to cause said concealed keys to control the registering and recording of information corresponding to the data information in the areas of said opaque member, when the concealed keys are depressed through the depression of said areas on the opaque member, thus increasing the control capacity of all of said control keys.

KENNETH M. BUCKEY.
PAUL M. KOONS.
PASCAL SPURLINO.

REFERENCES CITED

The following references are of record in the file of this patent:

UNITED STATES PATENTS

| Number | Name | Date |
| --- | --- | --- |
| 527,112 | Harte | Oct. 9, 1894 |
| 894,478 | Blaine, Jr. | July 28, 1908 |
| 914,741 | Meier | Mar. 9, 1909 |
| 2,032,168 | Degen | Feb. 25, 1936 |
| 2,033,147 | Hiemann | Mar. 10, 1936 |
| 2,127,498 | Westphal | Aug. 23, 1938 |
| 2,492,262 | Boyden et al. | Dec. 27, 1949 |